March 24, 1959 C. A. HOWELL 2,879,350
SIGNALLING APPARATUS FOR GARAGES
Filed Aug. 12, 1957 2 Sheets-Sheet 1
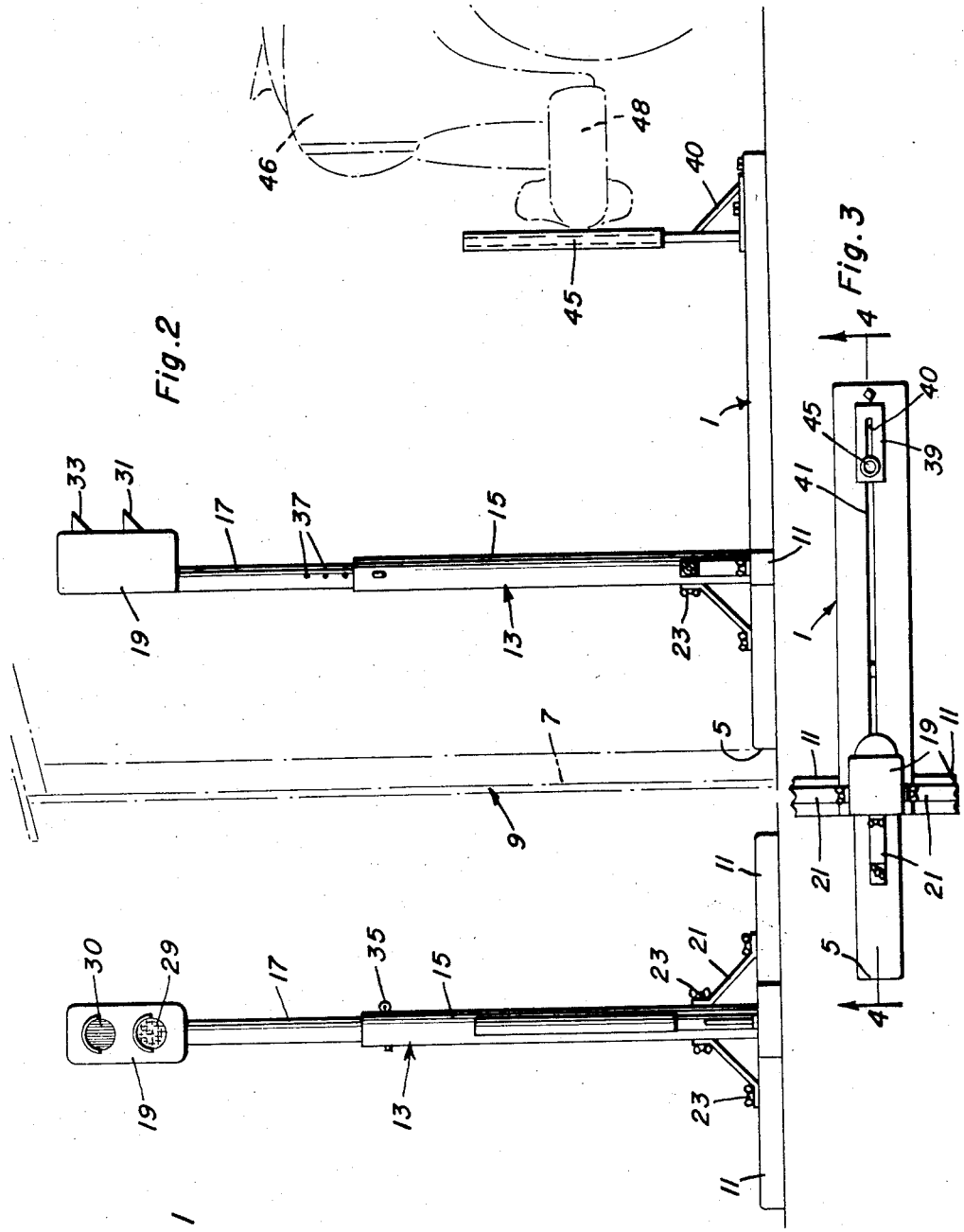
Charles Andrew Howell
INVENTOR.

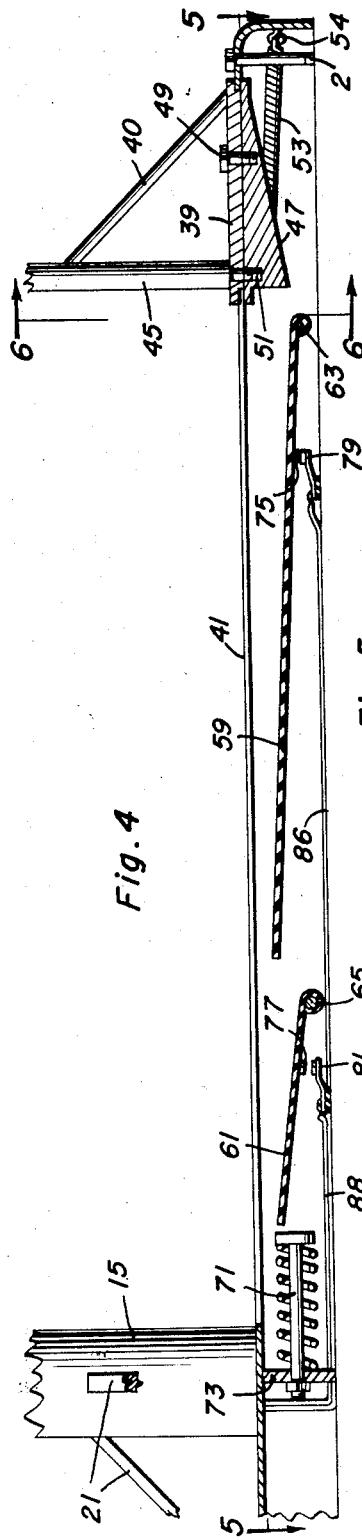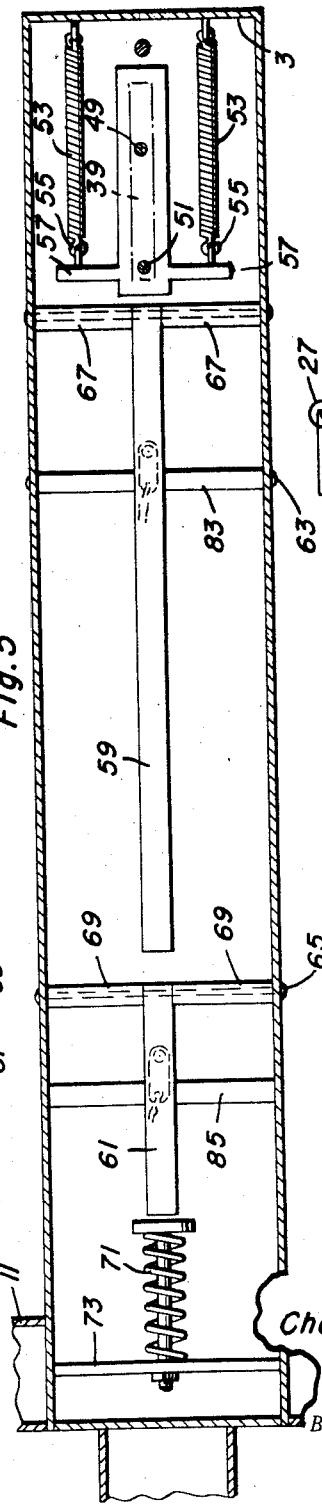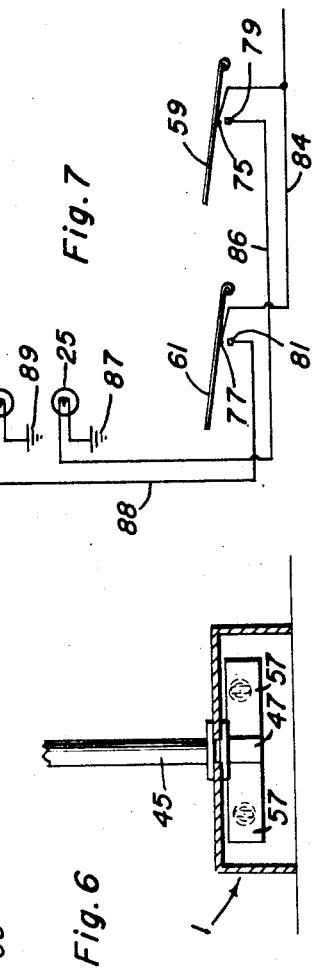

United States Patent Office 2,879,350
Patented Mar. 24, 1959

2,879,350

SIGNALLING APPARATUS FOR GARAGES

Charles Andrew Howell, Brooklyn, N.Y.

Application August 12, 1957, Serial No. 677,444

1 Claim. (Cl. 200—61.41)

My invention relates to improvements in signalling apparatus for installation in a garage to warn an automobile driver when driving into a garage, especially in backing in, when the automobile is in close proximity to the back wall of the garage so that the driver may stop before the bumper of the automobile strikes the back wall and causes damage thereto or to the automobile.

The primary object of my invention is to provide for the above purpose signal lights providing for twice warning the driver when the automobile is approaching too close to the back wall so that the automobile may be stopped before it hits the back wall together with electrical operating means operated by the bumper of the automobile for energizing the lights sequentially.

Another object is to provide operating means for energizing the lights which will not damage the automobile.

Still another object is to provide apparatus for accomplishing the above which is of simple practical construction and is inexpensive to install and service.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in front elevation of my improved apparatus in a preferred embodiment thereof;

Figure 2 is a view in side elevation of the same with an automobile shown fragmentarily in broken lines in position to operate the operating means for the lights and a portion of a garage shown in broken lines;

Figure 3 is a view in plan;

Figure 4 is an enlarged fragmentary view in vertical longitudinal section taken on the line 4—4 of Figure 3;

Figure 5 is a fragmentary view in horizontal section taken on the line 5—5 of Figure 4;

Figure 6 is a view in vertical transverse section taken on the line 6—6 of Figure 4; and Figure 7 is a diagrammatic view of an electrical circuit forming part of the operating means.

Referring to the drawings by numerals, the apparatus of my invention comprises an elongated hollow open bottom base member 1 with closed front and rear ends 3, 5 and of a length to fit longitudinally centrally in a garage with its rear end 5 engaged with the back wall 7 of a garage 9. A pair of aligned stabilizing arms extend laterally from opposite sides of the base member 1 adjacent the rear end 5 and are suitably fixed to said member 1. The base member 1 and arms 11 may be formed of any light, strong metal, and said member may be bolted down as at 2 to a concrete floor.

A mast 13 rises from the base member 1 at the juncture of said member 1 and arms 11 and comprises a tubular lower section 15 suitably secured on the base member 1 and an upper tubular section 17 vertically slidably fitted in the lower section and provided with a signal light box 19 on its upper end vertically adjustable to vary its height as may be required by vertical adjustment of the upper section 17 of the mast. Diagonal braces 21 extend from the base member 1 and arms 11 to the lower section 15 and are suitably bolted thereto as at 23. A pair of lower and upper electric light bulbs 25, 27 are suitably secured in the light box 19 in vertical alignment behind a pair of lower and upper amber and red lenses 29, 30 suitably fixed in the front of said box beneath lower and upper shields 31, 33 on said box. A cotter pin 35 is provided in the lower section 15 for selective insertion in vertically spaced apertures 37 in the upper section 17 to hold the latter and the light box 19 in different adjusted positions.

The operating means comprises a rectangular carriage 39 slidable rearwardly on the base member 1 from a normal position at the front end of said member 1. The carriage 39 is slidably mounted in a longitudinal central slot 41 in the top of the base member 1 and provided with a surrounding edge groove 43 straddling the side edges of said slot for mounting the same.

A rubber covered post 45 rises from the carriage 39 for engagement by the bumper 48 of an automobile to push the carriage 39 forwardly and is suitably braced as at 40. A longitudinal upwardly and rearwardly tapering cam 47 is secured by a bolt 49 to the underside of the carriage and also by a threaded lower end 51 of the post threaded into said carriage 39 and cam 47 and securing the post 45 in place. The purpose of the cam 47 will presently appear.

A pair of helical tension springs 53 at opposite sides of the carriage 39 are terminally fixed, as at 54, in the base member 1 to the front end 3 of said member and as at 55 to a pair of lateral arms 57 on the carriage 39 and yieldingly hold the carriage in normal position.

A pair of relatively long and short front and rear resilient switch arms 59, 61 are provided in the base member in longitudinally spaced relation in the path of movement of the carriage 39. The switch levers 59, 61 are of insulation material and are rigidly fixed at front ends thereof on cross rods 63, 65 in the member 1 in rearwardly and upwardly inclined position for engagement by the cam 47 and flexing downwardly thereby in response to forward movement of the carriage 39 to move said wedge along said levers 59, 61. In this connection, it is to be noted that the cam 47 engages the switch levers 59, 61 from end to end of the levers to hold said levers down until the cam 47 rides forwardly off said levers. Tubular spacers 67, 69 on the rods 63, 65 center the switch arms 59, 61 under the slot 41 and in the path of movement of the wedge 47.

A spring loaded horizontal plunger 71 slidable in a cross bar 73 in the base member 1 in the rear of the rear switch lever 61 cushions and limits forward movement of the carriage 39 and post 45 by engagement with the cam 47.

The front switch lever 59 when flexed downwardly energizes the lower light bulb 25 to flash an amber light signal and the rear switch lever 61 when flexed downwardly energizes the upper light bulb 27 to flash a red signal. For this purpose the switch arms 59, 61 are provided with bottom contacts 75, 77 for engaging when said levers are flexed downwardly a pair of front and rear rigid contacts 79, 81 secured on a pair of insulation cross bars 83, 85 in the base member 1. The contacts 75, 77 are interposed in a power input line 84 from a suitable source of electric power not shown. The contact 79 is connected by a line 86 to one side of the light bulb 25 which is grounded as at 87 in the usual manner. The contact 81 is connected by a line 88 to one side of the light bulb 27 grounded as at 89.

The operation of my invention will be readily understood. An automobile, as at 46, driven substantially partway into the garage 9 engages its bumper 48 with the post 45 and pushes the latter rearwardly to similarly slide the carriage 39 so that the cam 47 wipes along and flexes the switch lever 59 downwardly thus engaging the contacts 75, 79 to close circuit to the lower light bulb 25 which flashes an amber signal to the driver for a substantial period of time, due to the length of said lever 59, and warns the driver that he is approaching the parking stop limit at which he should stop the automobile within a safe distance from the rear wall 7. Upon further advance of the automobile, the cam 47 rides off the free end of the switch lever 59 which then reacts upwardly to break the circuit to the light bulb 25. At this point the cam 47 rides on and along the switch lever 61 and flexes the same downwardly to engage the contacts 77, 81 and close circuit to the light bulb 27 which then flashes a red stop signal indicating that the driver is in the parking stop limit and must stop the automobile 46. If the driver continues at this point until the cam rides off the free end of the switch lever 61, the cam 47 will abut the plunger 71 and the resulting jar will tend to cause the driver to stop quickly. At this point the cam will have slid off the free end of the switch lever 61 which will react upwardly to separate the contacts 77, 81 and break circuit to the light bulb 27. When the automobile is driven out of the garage 9 the cam by its taper will cam the switch lever downwardly and then release the same and cam the switch lever 59 downwardly and release the same under the pull of the springs 53 which will retract the carriage 39 to normal position. The light bulbs 27, 25 will thus be momentarily energized in sequence as the automobile leaves the garage thus illuminating the garage and advising the driver that the apparatus is in working order electrically when he leaves the garage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination, an elongated open frame disposed horizontally, a carriage slidably mounted on said frame for movement longitudinally of the frame in forward and rearward directions respectively, a switch contact fixed in said frame, an elongated resilient switch contact lever fixed at one end longitudinally in said frame in the path of movement of the carriage and inclined upwardly from said end for flexing downwardly to engage said contact, a cam depending from the carriage for movement along and off said lever to flex and release said lever in response to movement of the carriage in forward and rearward directions, said lever having a free other end, said cam tapering rearwardly longitudinally of said lever for camming coaction with said free end in response to movement of said carriage in a rearward direction, and a spring loaded plunger in said frame engaged by said cam to limit movement of said cam off said free end in response to movement of said carriage in a forward direction.

References Cited in the file of this patent

UNITED STATES PATENTS

| | | |
|---|---|---|
| 585,915 | Johnston | July 6, 1897 |
| 1,598,804 | Brumback | Sept. 7, 1926 |
| 1,961,871 | Caskey | June 5, 1934 |
| 2,200,739 | Evans | May 14, 1940 |
| 2,454,896 | Traub | Nov. 30, 1948 |
| 2,789,167 | Erbstosser | Apr. 16, 1957 |